United States Patent Office 3,654,372
Patented Apr. 4, 1972

3,654,372
1,1-BIS(TRIFLUOROMETHYL)-2-(TRIPHENYL-PHOSPHORANYLIDENE)ETHYLENE
Gail H. Birum, Kirkwood, Mo., and Clifford N. Matthews, Wilmette, Ill., assignors to Monsanto Company, St. Louis, Mo.
No Drawing. Continuation-in-part of application Ser. No. 605,592, Dec. 29, 1966, now Patent No. 3,488,408. This application Dec. 29, 1969, Ser. No. 888,890
Int. Cl. A01n 9/36; C07f 9/50, 9/54
U.S. Cl. 260—606.5 P                         3 Claims

ABSTRACT OF THE DISCLOSURE 1,1 - bis(trifluoromethyl) - 2 - (triphenylphosphoranylidene)ethylene, and acid adducts thereof. The compounds are useful intermediates for other chemical compositions and they can also be used as pest controlling agents, textile auxiliaries, additives for petroleum products, means for flame proofing polymers, ion exchangers and the like.

The present patent application is a continuation-in-part of Ser. No. 605,592 filed Dec. 29, 1966, now U.S. Pat. No. 3,488,408.

BACKGROUND OF THE INVENTION

In the formation of phosphine oxide and olefinic products from phosphorane and carbonyl reactants, it is usually assumed that reaction proceeds by way of a betaine which cleaves via an unstable cyclic transition state (G. Wittig and G. Geisler, Ann., 1953, 580, 44; S. Trippett, Quart. Rev., 1963, 17, 406; and A. W. Johnson, "Ylid Chemistry," Academic Press, New York, 1966). In cases where stable intermediates have been isolated it is generally believed that these intermediates have an ionic, betaine type structure. Therefore, when hexafluoroacetone and hexaphenylcarbodiphosphorane react, it would be expected that the resulting adduct, if stable, would have the following betaine structure in which both of the phosphorus-containing groups are ionic and identical.

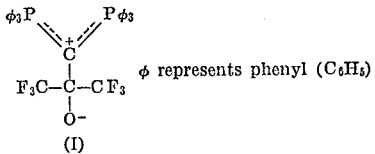

φ represents phenyl (C₆H₅)

However, the adduct obtained has instead one of the phosphorus atoms in a non-ionic, pentacovalent form as part of an unusual cyclic structure and the other as part of a phosphorus ylid substituent of the ring. The unexpected stability of this novel structure is believed due to the trifluoromethyl and phosphorus ylid substituents.

SUMMARY OF THE INVENTION

In accordance with this invention there is provided 4,4-bis(trifluoromethyl) - 2,2,2 - triphenyl-3-(triphenylphosphoranylidene)-1,2-oxaphosphetane, its thermal cleavage product and acid adducts of both.

The new oxaphosphetane (II) is a non-ionic four-membered ring compound containing pentacovalent phosphorus in the ring and a phosphorus ylid substituent on the ring.

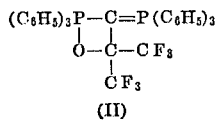

The relationship of the various new compounds of this invention and the process for producing them is best illustrated by the series of equations below.

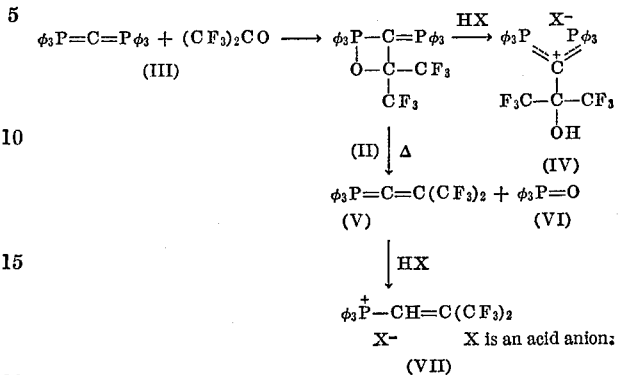

The starting material, hexaphenylcarbodiphosphorane (III), is more fully described in U.S. Pat. 3,262,971, issued July 26, 1966.

The new phosphorus compounds of this invention can be used as pest controlling agents, textile auxiliaries, means for soil amelioration, disinfectants (bactericides and fungicides), detergents, additives for petroleum products, means for flame-proofing polymers, ion exchangers and the like.

DESCRIPTION OF THE PREFERRED EMBODIMENTS

The oxaphosphetane (II) of this invention is readily prepared by allowing hexaphenylcarbodiphosphorane and hexafluoroacetone to react at a temperature from about −20 to about 85 degrees centigrade and preferably from about 20 to about 75 degrees centigrade for such a length of time as is needed to consume all of the hexaphenylcarbodiphosphorane. The completion of the reaction is readily noted by the disappearance of the yellow color of the hexaphenylcarbodiphosphorane; the desired product (II) is white. The thermal cleavage product, 1,1-bis(trifluoromethyl) - 2 - (triphenylphosphoranylidene)ethylene (V), is readily obtained by heating the oxaphosphetane (II) to a temperature of at least 90 degrees centigrade and preferably from about 110 to 140 degrees centigrade. The thermal cleavage is advantageously facilitated by carrying out the cleavage reaction in the presence of an inert diluent such as chlorobenzene, xylene, diglyme and other liquids which have boiling points above the temperature of the reaction.

The acid adducts of II and V are prepared by reacting an acid with II or V by reaction with acid followed by metathesis. HX in the previously discussed equations represent salt forming acids whether they may be monoacidic or polyacidic. Thus HX exemplifies hydrochloric acid, hydrobromic acid, hydroiodic acid, trifluoroacetic acid, sulfuric acid, fluoroboric acid, phosphoric acid and the like. Exchange of anions by metathesis is also possible. For example, replacement of bromide by reaction of IV or VII (X=Br) with sodium tetraphenylboron yields IV or VII (X=Bφ₄).

Generally it is preferred that the reactants be present in stoichiometric quantities or with a slight excess of the most easily removed reactant. For example, when reacting hexaphenylcarbodiphosphorane and hexafluoroacetone, an excess of hexafluoroacetone would be preferred. In the same way in preparing the salts a slight excess of the acid in to be preferred.

The following examples are illustrative of the invention and unless otherwise specified all parts are by weight and all temperatures are expressed as degrees centigrade.

Example 1

Gaseous hexafluoroacetone was dispersed in a stirred mixture of hexaphenylcarbodiphosphorane (III) (21.4 grams, 0.04 mole) and dry diglyme (65 grams) under nitrogen at 40–50° C. The flow of hexafluoroacetone was continued for ½ hours after the yellow color of the hexaphenylcarbodiphosphorane disappeared. The reaction mixture was then cooled at 5° for three hours and filtered under nitrogen. The resulting product was washed with diglyme and diethyl ether to obtain 21.5 grams (76 percent yield) of 4,4 - bis(trifluoromethyl)-2,2,2-triphenyl-3-(triphenylphosphoranylidene) - 1,2 - oxaphosphetane (II), a white solid, melting point 155–157° (decomposition; 157–158° from diglyme-diethyl ether). Molecular weight by vapor pressure osmometry in benzene: 706 and 700 (theoretical for a 1:1 adduct, 702.6). The $P^{31}$ N.M.R. spectrum exhibited doublets of equal area at $-7.3 \pm 0.2$ p.p.m. and at $+54.0 \pm 1.0$ p.p.m., $J_{PP}$, $47 \pm 7$ c.p.s. (relative to $H_3PO_4$ and measured in a saturated methylene chloride solution at both 24.3 and 40.5 mc.). The $F^{19}$ N.M.R. spectrum had a doublet at $+71.2 \pm 0.2$ p.p.m. relative to $CCl_3F$), $J_{FP}$ 0.8 c.p.s. The $H^1$ N.M.R. spectrum had a multi-peak aryl hydrogen region at $-6.5$ to $-8.0$ p.p.m. (relative to tetramethylsilane).

*Analysis.*—Calculated for $C_{40}H_{30}F_6OP_2$ (percent): C, 68.37; H, 4.30; F, 16.22; P, 8.82. Found (percent): C, 68.17; H, 4.25; F, 16.27; P, 8.91.

Example 2

A 1.0 gram portion of the adduct of hexaphenylcarbodiphosphorane and hexafluoroacetone (Example 1) was stirred in 5 grams of diglyme as 1.5 grams of 65 percent hexafluorophosphoric acid was added dropwise. Heat of reaction raised the temperature to 45°. The reaction mixture was stirred for two hours and then diluted with ether to precipitate 1.1 grams of white powder (IV) (X=$PF_6$). Recrystallization from diglyme by precipitation with ether, and drying at 50°/0.1 mm. gave 1.0 gram (83 percent yield), M.P. 213–213.5° (dec.). The $P^{31}$ N.M.R. spectrum in acetonitrile contained a moderately broad peak at $-21.6$ p.p.m. and a heptet at $+144.8$ p.p.m. ($J_{PF}$ 706 c.p.s.); the $F^{19}$ N.M.R. spectrum contained a single at $+71.6$ p.p.m. and a doublet at $+72.5$ p.p.m. ($J_{FP}$ 709 c.p.s.), the area ratio of singlet to doublet being 1:1; the $H^1$ N.M.R. spectrum contained an aryl proton region at $-7.1$ to $-8.0$ p.p.m. and a broad hydroxylic proton peak at $-6.3$ p.p.m., the areas approximating the theoretical 30:1 ratio.

*Analysis.*—Calculated for $C_{40}H_{31}F_{12}OP_3$ (percent): C, 56.65; H, 3.68; F, 26.88; P, 10.96. Found (percent): C, 56.62; H, 3.79; F, 27.12; P, 11.17.

Example 3

A mixture of 1.0 gram of II, prepared in Example 1, in 6 grams of diglyme was stirred as 0.5 gram of 48 percent fluoroboric acid was added dropwise. After 1.5 hours, 1.1 grams of white solid was precipitated by addition of ether. Recrystallization by addition of ether to a solution in diglyme-acetonitrile, and drying at 60°/0.1 mm., gave 0.9 gram (80 percent yield) of white solid, M.P. 215–215.5° (dec.). The $F^{19}$ N.M.R. spectrum measured in $CH_3CN$ contained peaks at $+70.3$ p.p.m. and at $+150.3$ p.p.m. in a 3:2 area ratio; the $P^{31}$ N.M.R. spectrum contained a moderately broad peak at $-22.0 \pm 1.1$ p.p.m.; the $H^1$ N.M.R. spectrum contained an aryl proton region at $-7.1$ to $-8.0$ p.p.m. and a broad hydroxylic peak at $-6.25$ p.p.m., approximating a 30:1 ratio.

*Analysis.*—Calculated for $C_{40}H_{31}BF_{10}OP_2$ (percent): C, 60.75; H, 3.96; B, 1.37; F, 24.05; P, 7.84. Found (percent): C, 60.67; H, 4.20; B, 1.20; F, 23.81; P, 7.74.

Example 4

A mixture of 1.0 gram of II, prepared in Example 1, and 5 grams of diglyme was stirred as 0.5 gram of 48 percent hydrobromic acid was added dropwise. After 0.25 hour ether was added to precipitate a solid product which was recrystallized from diglyme-acetonitrile to give 0.5 gram of light tan solid, M.P. 213–213.5° (dec.). The $P^{31}$ N.M.R. spectrum measured in $CH_3CN$ contained a broad peak at $-22.0$ p.p.m.; and the $F^{19}$ N.M.R. spectrum contained a singlet at $+71$ p.p.m.

*Analysis.*—Calculated for $C_{40}H_{31}BrF_6OP_2$ (percent): C, 61.30; H, 3.99; Br, 10.20; F, 14.56; P, 7.92. Found (percent): C, 60.65; H, 4.02; Br, 10.76; F, 15.08; P, 7.75.

Chloride and iodide salts were similarly prepared by addition of hydrochloric and hydriodic acids to II.

Example 5

A solution of 0.5 gram of sodium tetraphenylboron [$NaB(C_6H_5)_4$] in methanol was added dropwise to a stirred solution of 0.7 gram of the bromide salt (Example 4) in methanol. The reaction mixture was stirred for 0.5 hour at room temperature and then filtered. The product was washed with methanol and with distilled water and dried at 60°/0.1 mm. to give 0.8 gram of white powder, M.P. 130–137° (dec.).

*Analysis.*—Calculated for $C_{64}H_{51}BF_6OP_2$ (percent): F, 11.13; P, 6.06. Found (percent): F, 11.15; P, 5.89.

Example 6

A mixture of 38.0 grams of the adduct of hexaphenylcarbodiphosphorane and hexafluoroacetone, prepared according to Example 1, and 35 grams of chlorobenzene was stirred and warmed at 120–126° C. for 5 minutes under nitrogen. The resulting dark red solution was cooled at 5° C. for 20 hours and then filtered under nitrogen. The product was washed with ether to give 18.7 grams of an orange solid mixture. The $P^{31}$ N.M.R. spectrum of a benzene solution of this orange solid consisted of a singlet at $-24.5$ p.p.m. for triphenylphosphine oxide and a singlet at $-4.1$ p.p.m., the latter singlet and an $F^{19}$ doublet at $+61.4$ p.p.m. ($J_{FP}$ 3.5 c.p.s.) being attributed to 1,1-bis-(trifluoromethyl) - 2 - (triphenylphosphoranylidene)ethylene (V). The area ratio of the $P^{31}$ singlet at $-24.5$ p.p.m. to that at $-4.1$ p.p.m. was 4:3.

Example 7

A 5.0 grams portion of 1,1-bis(trifluoromethyl)-2-(triphenylphosphoranylidene)ethylene (V) and triphenylphosphine oxide from Example 6 was dissolved in 20 ml. of dry benzene, and the resulting orange solution was stirred under nitrogen at ambient temperature as anhydrous hydrogen chloride was dispersed below the surface. The hydrogen chloride treatment was discontinued when the last trace of orange color disappeared, and the reaction mixture was filtered under nitrogen. The product was washed with benzene and ether and then recrystallized from diglyme-acetonitrile to give 1.6 grams of 2,2-bis(trifluoromethyl)vinyltriphenylphosphonium chloride (VII), a white solid, M.P. 153–154° (decomposition.) The $P^{31}$ N.M.R. spectrum of a solution in $CDCl_3$ had a single peak at $-17.3$ p.p.m.; the $H^1$ spectrum had a doublet at $-9.1$ p.p.m. ($J_{HP}$ 8.5 c.p.s.) and aryl hydrogen multiplets at $-7.5$ to $-8.3$ p.p.m., the areas approximating a 1:15 ratio; and the $P^{19}$ spectrum had quartets of equal area at $+58.1$ and $+63.2$ p.p.m. ($J_{FP}$, 7.5 c.p.s.).

*Analysis.*—Calculated for $C_{22}H_{16}ClF_6P_2$ (percent): C, 57.34; H, 3.50; Cl, 7.69; F, 24.74; P, 6.72. Found (percent: C, 57.24; H, 3.69; Cl, 7.93; F, 24.68; P, 6.73.

Triphenylphosphine oxide (2.2 grams), having infrared and N.M.R. spectra essentially identical to those of an authentic sample was isolated from the filtrate obtained after the hydrogen chloride treatment.

The foregoing examples have been described in the above specification for the purpose of illustration and not limitation. Many other modifications and ramifications based on this disclosure will naturally suggest themselves to one skilled in the art. These are intended to be comprehended as within the scope of this invention.

Having thus described our invention, what we desire to claim and secure by Letters Patent is:

1. 1,1 - bis(trifluoromethyl) - 2 - (triphenylphosphoranylidene)ethylene.

2. The acid adducts of 1,1-bis(trifluoromethyl)-2-(triphenylphosphoranylidene)ethylene having the formula

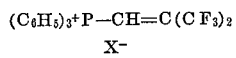

wherein X is an acid anion of a salt forming acid.

3. 2,2 - bis(trifluoromethyl) - vinyltriphenylphosphonium chloride.

References Cited
UNITED STATES PATENTS 3,488,408  1/1970  Birum et al. _____ 260—606.5 F JAMES E. POER, Primary Examiner W. F. W. BELLAMY, Assistant Examiner U.S. Cl. X.R.

260—606.5 F; 424—221, 198